US010128615B2

(12) United States Patent
Thomas et al.

(10) Patent No.: US 10,128,615 B2
(45) Date of Patent: Nov. 13, 2018

(54) VARIABLE-CLOCKING TERMINAL ASSEMBLY

(71) Applicant: The Boeing Company, Chicago, IL (US)

(72) Inventors: Daniel S. Thomas, Summerville, SC (US); Daniel M. Grippe, Summerville, SC (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 15/266,454

(22) Filed: Sep. 15, 2016

(65) Prior Publication Data

US 2018/0076568 A1 Mar. 15, 2018

(51) Int. Cl.

| | |
|---|---|
| ***B23P 19/00*** | (2006.01) |
| ***H01R 43/20*** | (2006.01) |
| ***H01R 13/639*** | (2006.01) |
| ***H01R 11/12*** | (2006.01) |
| ***H01R 24/38*** | (2011.01) |
| ***H01R 43/048*** | (2006.01) |
| ***H01R 4/20*** | (2006.01) |
| ***H01R 4/30*** | (2006.01) |
| ***H01R 4/50*** | (2006.01) |
| *H01R 103/00* | (2006.01) |

(52) U.S. Cl.

CPC ............ *H01R 13/639* (2013.01); *H01R 4/20* (2013.01); *H01R 4/304* (2013.01); *H01R 4/5025* (2013.01); *H01R 11/12* (2013.01); *H01R 24/38* (2013.01); *H01R 43/048* (2013.01); *H01R 2103/00* (2013.01); *Y10T 29/49174* (2015.01); *Y10T 29/53204* (2015.01)

(58) Field of Classification Search

CPC .... H01R 13/5804; H01R 43/048; H01R 4/20; H01G 9/008; H02G 15/22; Y10T 29/49174; Y10T 29/49915; Y10T 29/53204; Y10T 29/53222

USPC ...... 29/747, 566.4, 748, 751, 857, 868, 874, 29/876

See application file for complete search history.

(56) References Cited

U.S. PATENT DOCUMENTS 3,409,865 A * 11/1968 Shannon .............. H01R 11/281 439/760
5,925,853 A * 7/1999 Miller .................... H01R 11/12 174/87

OTHER PUBLICATIONS

Panduit Product Bulletin, "Copper Compression Metric Lugs and Splices," retrieved Sep. 15, 2016.

* cited by examiner

*Primary Examiner* — Thiem Phan

(57) ABSTRACT

A variable-clocking terminal assembly includes a crimp barrel, a terminal lug, and a locking collar. The crimp barrel includes a crimp portion having a crimp portion cavity sized and configured to receive a cable end of an electrical cable. The crimp barrel includes a conical portion extending axially from the crimp portion. The terminal lug has a cylindrical portion and a terminal tongue extending outwardly from the cylindrical portion. The cylindrical portion has a conical cavity configured complementary to the conical portion. The locking collar has collar threads configured to engage threads formed on one of the crimp barrel and the terminal lug for drawing the conical portion into direct physical engagement with the conical cavity in a manner locking an orientation of the terminal lug relative to the crimp barrel and establishing electrical continuity between the conical portion and the conical cavity.

20 Claims, 12 Drawing Sheets

VARIABLE-CLOCKING TERMINAL ASSEMBLY

FIELD

The present disclosure relates generally to cable terminals and, more particularly, to a variable-clocking terminal assembly for coupling an electrical cable to a terminal block.

BACKGROUND

Electrical wiring is widely used in many industries for transmitting electrical signals and electrical power. For example, power feeder cables are used in the marine, automotive, and aerospace industries for transmitting electrical power from a power source to a load. In some industries, power feeder cables are pre-assembled by a supplier and then shipped to a production facility for installation in a vehicle. During pre-assembly, conventional terminal fittings are installed on the ends of the power feeder cable. Each terminal fitting has a tongue for electrically connecting to a terminal block during installation of the power feeder cable in the vehicle. One or more holes in the tongue are mounted onto corresponding studs of the terminal block, and a nut is threaded onto each stud to secure the tongue against an outer surface of the terminal block.

During pre-assembly of a cable, the terminal fittings are rigidly crimped onto the cable ends at a fixed clocking orientation. During installation of the cable into a vehicle, the clocking orientation of the terminal fitting may not match the orientation of the terminal block. More specifically, the clocking orientation of a terminal fitting may be such that the tongue does not lie flat (e.g., parallel) against the outer surface of the terminal block prior to installing a nut onto the terminal stud. Although the clocking orientation of a terminal fitting may be adjusted by a small amount, adjustment of the terminal fitting by more that few degrees may result in kinking of the power feeder cable which may generate mechanical stress on the terminal block, the terminal fitting, and/or the cable when the nut is fastened down onto the tongue. In addition, adjusting the clocking orientation of the terminal fitting may result in bending of the terminal fitting or tongue, or the development of small bend radii and/or kinks in the power feeder cable, requiring time-consuming and costly rework and/or replacement of the cable and/or terminal fitting.

As can be seen, there exists a need in the art for a terminal fitting that can be pre-assembled onto a cable end, and then installed on a terminal block in a manner such that the orientation of the tongue matches the orientation of the terminal block.

SUMMARY

The above-noted needs associated with electrical terminals are specifically addressed and alleviated by the present disclosure which provides a variable-clocking terminal assembly including a crimp barrel, a terminal lug, and a locking collar. The crimp barrel includes a crimp portion having a crimp portion cavity sized and configured to receive a cable end of an electrical cable. The crimp barrel includes a conical portion extending axially from the crimp portion. The terminal lug has a cylindrical portion and a terminal tongue extending outwardly from the cylindrical portion. The cylindrical portion has a conical cavity configured complementary to the conical portion. The locking collar has collar threads configured to engage threads formed on the crimp barrel for drawing the conical portion into direct physical engagement with the conical cavity in a manner locking an orientation of the terminal lug relative to the crimp barrel and establishing electrical continuity between the conical portion and the conical cavity.

In a further embodiment, disclosed is a variable-clocking terminal assembly having a crimp barrel, a terminal lug, and a locking collar. The crimp barrel includes a crimp portion and a conical portion extending axially from the crimp portion. The crimp portion has a crimp portion cavity configured to receive a cable end of an electrical cable. The terminal lug has a cylindrical portion and a terminal tongue. The cylindrical portion has a conical cavity configured complementary to the conical portion. The locking collar is mounted on the cylindrical portion of the terminal lug and has collar threads configured to engage crimp barrel threads formed on an intermediate portion of the crimp barrel for drawing the conical portion into direct physical engagement with the conical cavity.

Also disclosed is a method of installing a terminal assembly. The method includes providing an electrical cable having a terminal assembly mounted on a cable end of the electrical cable. The terminal assembly includes a crimp barrel, a terminal lug, and a locking collar. The crimp barrel includes a crimp portion mounted on the cable end and a conical portion extending axially from the crimp portion. The terminal lug has a cylindrical portion and a terminal tongue extending from the cylindrical portion. The cylindrical portion has a conical cavity containing the conical portion. The locking collar has collar threads configured to engage threads formed on the crimp barrel. The method includes adjusting the clocking orientation of the terminal lug relative to the crimp barrel, and threadably engaging the locking collar onto threads formed on the crimp barrel. In addition, the method includes drawing the conical portion into contact with the conical cavity in response to threadably engaging the locking collar onto the threads of the crimp barrel. In addition, the method includes tightening the locking collar until rotation of the terminal lug relative to the crimp barrel is prevented.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
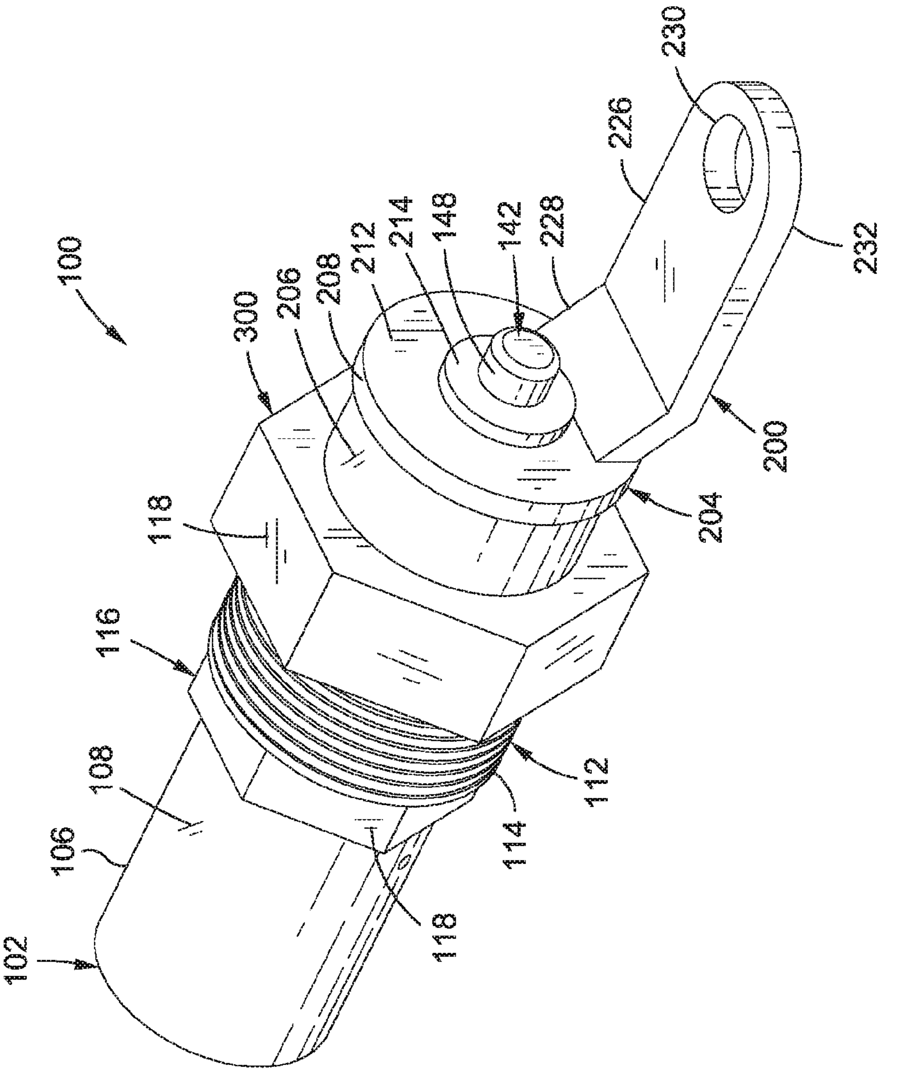
FIG. 1 is a perspective view of an example of a variable-clocking terminal assembly as disclosed herein.
Figure 2:
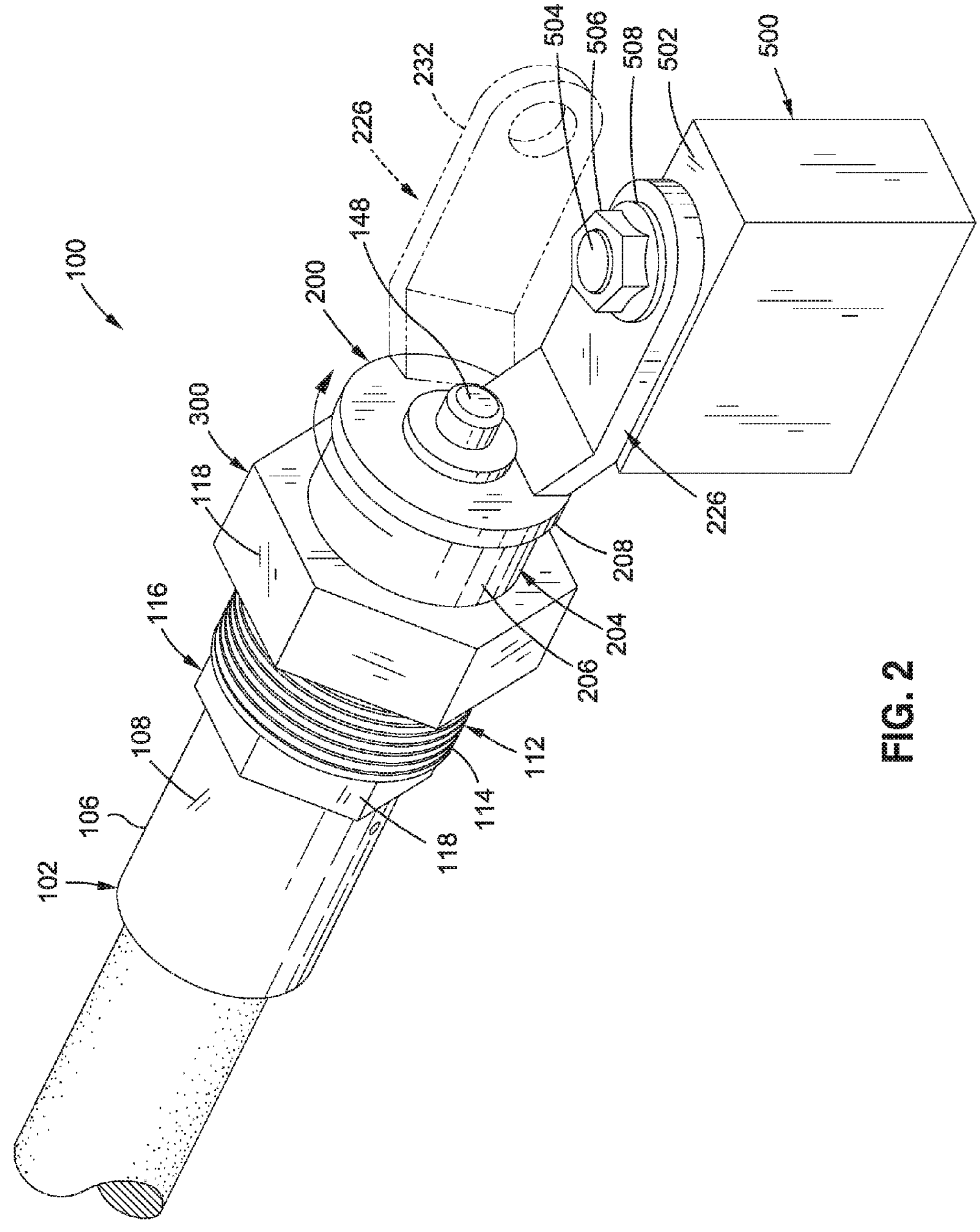
FIG. 2 is a perspective view of a terminal assembly mounted to a terminal block.

Referring now to the drawings wherein the showings are for purposes of illustrating preferred and various embodiments of the disclosure, shown in FIG. 1 is a perspective view of an example of a variable-clocking terminal assembly 100 as disclosed herein. The terminal assembly 100 includes a crimp barrel 102, a terminal lug 200, and a locking collar 300. The crimp barrel 102 includes a crimp portion 106 having a crimp portion cavity 110 sized and configured to receive a cable end 402 of an electrical cable 400 (FIG. 2). In the example shown, the crimp barrel 102 includes a conical portion 120 (FIGS. 3-4) and an intermediate portion 112 located between the crimp portion 106 and the conical portion 120. The terminal lug 200 has a cylindrical portion 204 and a terminal tongue 226 extending outwardly from the cylindrical portion 204. The terminal tongue 226 is configured to be mounted to a terminal stud 504 (FIG. 2) of a terminal block 500. The cylindrical portion 204 has a conical cavity 220 (FIGS. 3-4) configured to receive the conical portion 120.

Figure 21:
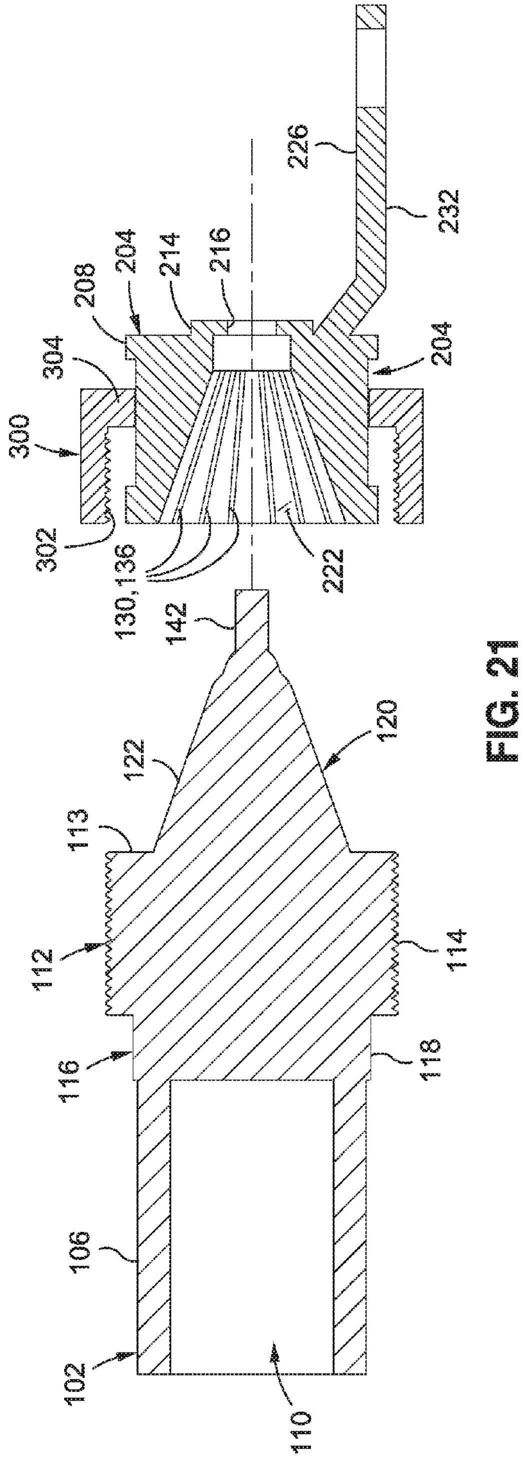
FIG. 21 is a side sectional view of the terminal assembly of FIG. 20 and illustrating ribs formed on the conical inner surface of the conical cavity of the terminal lug.
Figure 22:
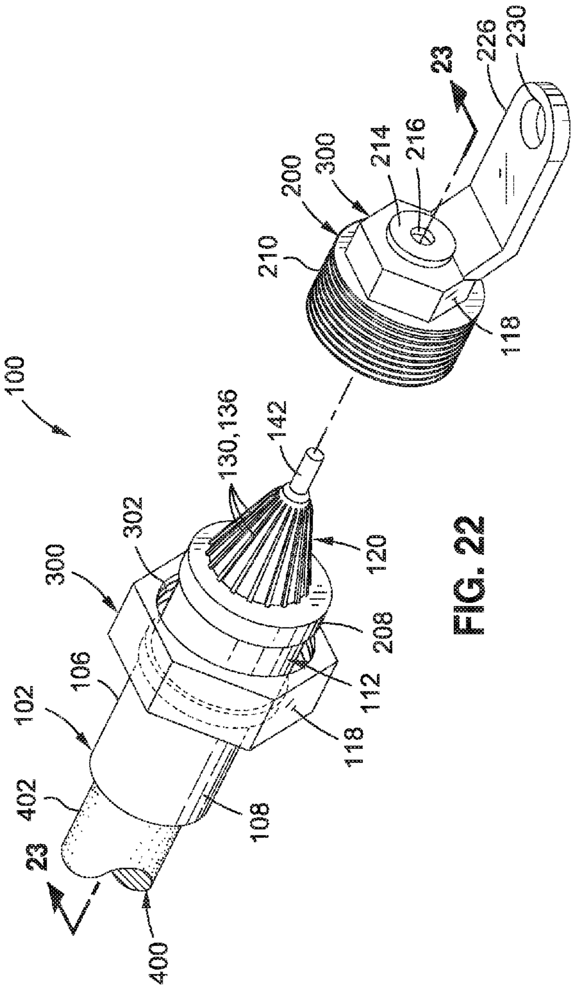
FIG. 22 is a perspective view of an example of a terminal assembly having terminal lug threads on the terminal lug and illustrating the locking collar mounted on the crimp barrel.
Figure 23:
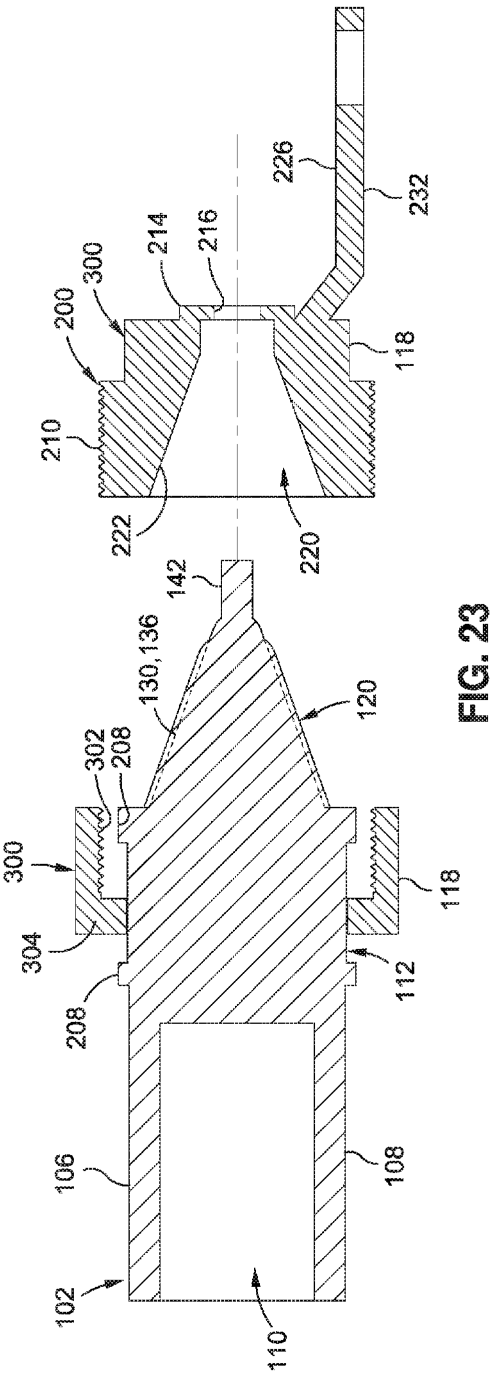
FIG. 23 is a transverse sectional view of the terminal assembly taken along line 23 of FIG. 22 and illustrating the terminal lug threads formed on the terminal lug and the locking collar mounted on the crimp barrel.

As described in greater detail below, in an embodiment, the crimp barrel 102 may include a shaft 142 (FIGS. 3-4) extending axially outwardly from the conical portion 120. The shaft 142 may be sized and configured to protrude through the bore 216 (FIGS. 3-4) in the end wall 212 of the terminal lug 200. An enlarged head 148 may be formed on the shaft end 144 on a side of the end wall 212 opposite the conical portion 120 as a means to loosely retain the terminal lug 200 with the crimp barrel 102. In the example shown, the locking collar 300 has collar threads 302 (FIGS. 3-4) configured to engage crimp barrel threads 114 formed on the crimp barrel 102 (FIGS. 1-21). Alternatively, the terminal assembly 100 may be provided in an embodiment described below wherein the locking collar 300 is configured to threadably engage the terminal lug threads 210 formed on the terminal lug 200 (FIGS. 22-23). Regardless of whether the locking collar 300 engages crimp barrel threads 114 on the crimp barrel 102 or terminal lug threads 210 on the terminal lug 200, the locking collar 300 is configured to axially draw the conical portion 120 of the crimp barrel 102 into engagement with the conical cavity 220 of the terminal lug 200.

Referring to FIG. 2, by providing the crimp barrel 102 and the terminal lug 200 as separate components, the terminal lug 200 is initially freely rotatable relative to the crimp barrel 102 such that the clocking orientation of the terminal lug 200 can be adjusted as desired. In one example, the terminal lug 200 may be rotatably adjusted until the terminal tongue bottom surface 232 of the terminal tongue 226 (FIG. 2) is parallel (e.g., ±5 degrees) to an outer surface 502 of a terminal block 500. After adjusting the clocking of the terminal lug 200 to the desired orientation relative to the crimp barrel 102, the locking collar 300 can be torqued or tightened onto the threads of the crimp barrel 102 or the terminal lug 200 such as by using simple hand tools (e.g., an open end wrench—not shown). The terminal assembly 100 may include an anti-rotation feature 116 to prevent rotation of the crimp barrel 102 during torqueing or tightening of the locking collar 300. The torqueing or tightening of the locking collar 300 axially draws the conical portion 120 into direct physical engagement against the conical cavity 220 in a manner preventing rotation of the terminal lug 200 relative to the crimp barrel 102, and establishing electrical continuity between the conical portion 120 and the conical cavity 220.

In FIG. 2, the terminal tongue 226 is shown mounted on a terminal stud 504 extending upwardly from the terminal block 500. A terminal nut 506 and a washer 508 are engaged to the terminal stud 504 to fasten the terminal tongue 226 against the outer surface 502 of the terminal block 500. Advantageously, the presently-disclosed terminal assembly 100 provides a safe and quick method for securing an electrical terminal to a terminal block 500 without inducing preload on any of the components such as the terminal assembly 100, the terminal block 500, and the electrical cable 400.

Figures 3, 4:
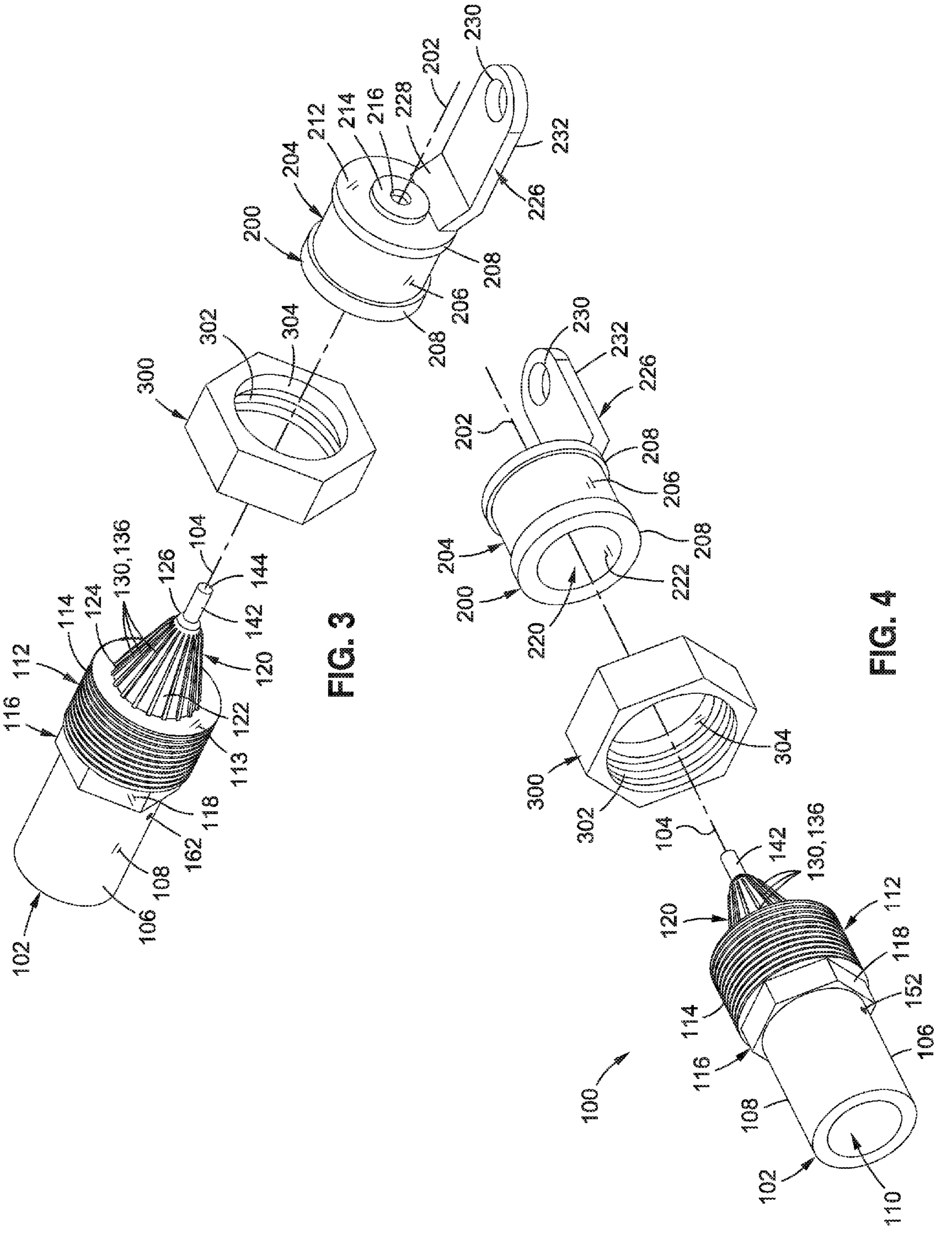
FIG. 3 is a front perspective exploded view of an example of a terminal assembly illustrating the crimp barrel, the terminal lug, and the locking collar that make up the terminal assembly, and further illustrating protrusions in the form of ribs on a conical portion of the crimp barrel.
FIG. 4 is a rear perspective exploded view of the terminal assembly of FIG. 3 and illustrating a shaft extending axially outwardly from the conical portion.

FIG. 3 is a front exploded view of an example of a terminal assembly 100 showing the crimp barrel 102, the terminal lug 200, and the locking collar 300. FIG. 4 is a rear exploded view of the terminal assembly 100 showing the crimp portion 106 which has a crimp portion outer surface 108 and a crimp portion cavity 110 sized and configured to receive a cable end 402 of an electrical wire or an electrical cable 400 (FIG. 2). The crimp portion cavity 110 may be sized and configured to receive a cable end 402 of a conducting wire or cable 400 having a diameter of up to 0.5 inch or larger, or a gauge of up to 4/0 (4/aught) or larger. The electrical wire or cable 400 may be an AC cable or a DC cable, and may be capable of handling from 6V to 650V or more. The electrical wire or cable 400 may be formed of copper, aluminum, steel, or other alloys. The electrical cable 400 may be provided as bundled strands of wire or the electrical cable 400 may be a single metallic cable.

Although the crimp portion cavity 110 in FIG. 3-4 is shown having a cylindrical shape for receiving a wire or cable 400 having a circular cross-section, in other examples, the crimp portion cavity 110 may have a non-cylindrical shape (not shown) configured for receiving a wire or cable 400 that has a non-circular cross-section. For example, the crimp portion cavity 110 may be sized and configured to receive a wire or cable 400 having an oblong cross-sectional shape (not shown). The crimp portion 106 may have a wall thickness that facilitates the crimping attachment of a cable end 402 to the crimp portion 106 such as by using a crimping tool (not shown). During a crimping operation, the crimp portion 106 may be locally deformed as a means to mechanically clamp the cable end 402 inside the crimp portion 106 and establish a positive mechanical and electrical connection between the cable 400 and the crimp portion 106. Alternatively, a cable end 402 may be soldered into the crimp portion cavity 110. In another example, a cable end 402 may be adhesively bonded to the crimp portion cavity 110 using electrically conductive adhesive (not shown). In a still further example, a cable end 402 may be mechanically fastened to the crimp portion cavity 110.

In the example shown in FIGS. 3-4, the crimp barrel 102 has an intermediate portion 112 located between the crimp portion 106 and the conical portion 120. The intermediate portion 112 has crimp barrel threads 114 for engagement by the collar threads 302 of the locking collar 300. In the example shown, the crimp barrel threads 114 extend along an entire length of the intermediate portion 112. However, in other examples, the crimp barrel threads 114 may extend along a section of the length of the intermediate portion 112 and which may be located adjacent to the intermediate wall 113. The remaining lengthwise section of the intermediate portion 112 adjacent the crimp barrel 102 may be devoid of crimp barrel threads 114. In the example of FIGS. 3-4, the crimp barrel 102 may include an anti-rotation feature 116 located between the intermediate portion 112 and the crimp barrel 102. As described in greater detail below, the anti-rotation feature 116 may be configured as a multi-faceted feature having a plurality of flats 118 for engagement by a hand tool such as an open end wrench for preventing rotation of the crimp barrel 102 during tightening of the locking collar 300, as described in greater detail below.

Referring still to FIGS. 3-4, the crimp barrel 102 includes the conical portion 120 extending axially from the intermediate wall 113. The intermediate wall 113 defines the cone base 124 of the conical portion 120. The conical portion 120 extends from the cone base 124 to the cone end 126. The conical portion 120, the intermediate portion 112, and the crimp portion 106 may be coaxial with the crimp barrel longitudinal axis 104.

The conical portion 120 has a conical outer surface 122. In the example shown, the conical portion 120 includes a plurality of protrusions 130 extending above the conical outer surface 122. In FIGS. 3-4, the protrusions 130 are configured as a plurality of ribs 136. The ribs 136 are angularly spaced around the circumference of the conical outer surface 122 and generally extend along an axial direction. As described in greater detail below, the protrusions 130 ensure direct physical contact between the conical portion 120 of the crimp barrel 102 and the conical cavity 220 of the terminal lug 200 when the locking collar 300 is tightened.

Figures 8, 9, 10:
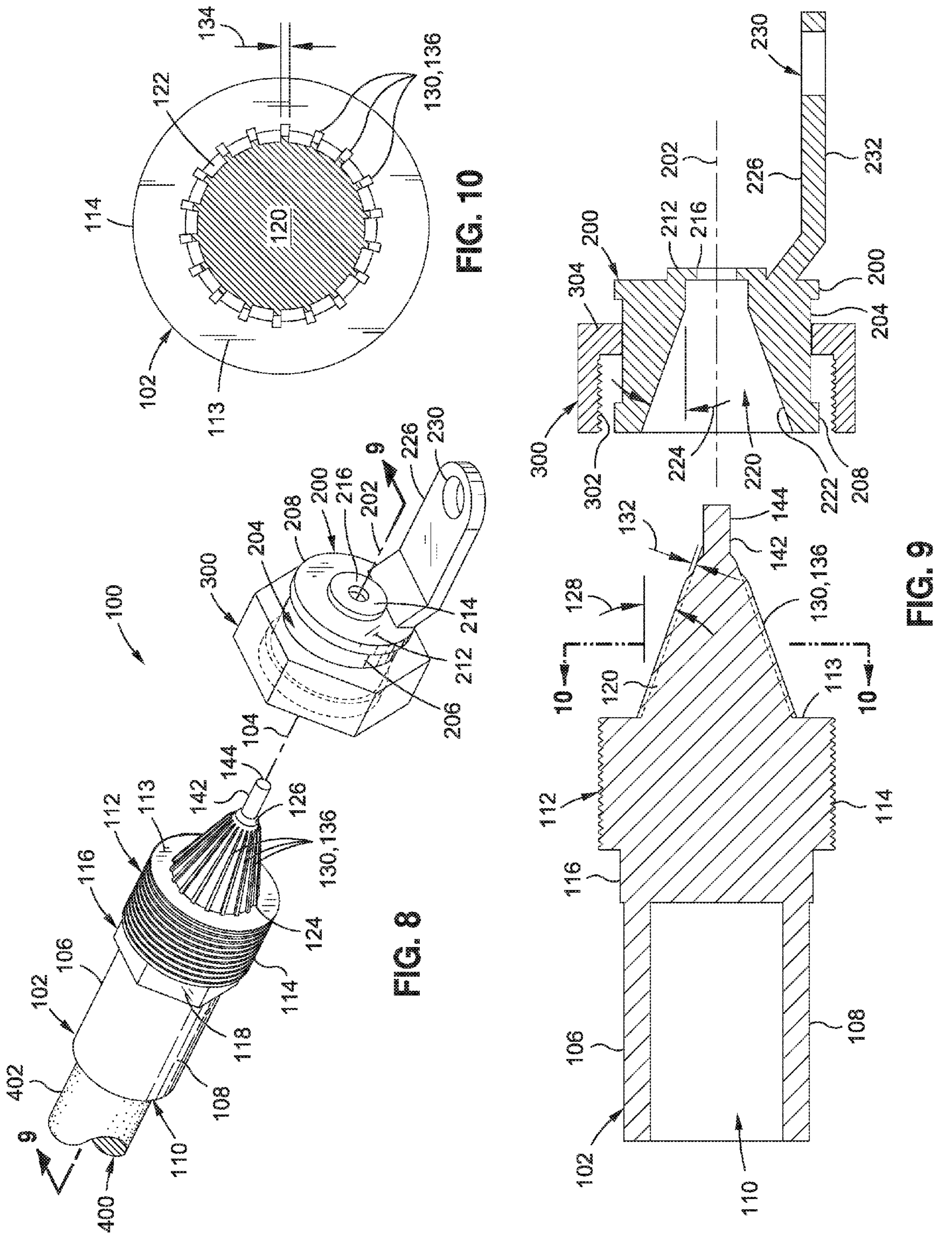
FIG. 8 is a perspective view of the locking collar mounted on the terminal lug and separated from the crimp barrel prior to assembly.
FIG. 9 is a side sectional view of the terminal assembly taken along line 9 of FIG. 8 and illustrating protrusions in the form of ribs on a conical outer surface of the conical portion of the crimp barrel.
FIG. 10 is a transverse sectional view of the terminal assembly taken along line 10 of FIG. 9 and illustrating angularly spaced ribs formed on the conical outer surface of the conical portion.

The protrusions 130 (e.g., ribs 136) may have a relatively small protrusion height 132 (e.g., 0.001-0.050 inch—FIG. 8) and a relatively small protrusion width 134 (e.g., 0.001-0.050 inch—FIG. 10). In some examples, the protrusions 130 may be configured to at least partially deform against the conical inner surface 222 of the conical cavity 220 during tightening of the locking collar 300. The protrusions 130 create multiple electrical continuity paths between the conical portion 120 and the conical cavity 220. The direct contact between the protrusions 130 and the conical inner surface 222 may prevent arcing between the conical portion 120 and the conical cavity 220 when electrical current is passing between the crimp barrel 102 and the terminal lug 200.

In the example of FIGS. 3-4, the crimp barrel 102 has a centrally located shaft 142 extending axially outwardly from the cone end 126 of the conical portion 120. The shaft 142 may have a shaft diameter 146 (FIG. 7) in the range of from 0.060-0.50 inch, and may be coaxial with the crimp barrel longitudinal axis 104. The cylindrical portion 204 of the terminal lug 200 may have an end wall 212. The end wall 212 may have a centrally-located bore 216 that may be coaxial with the terminal lug longitudinal axis 202. The bore 216 through the end wall 212 of the terminal lug 200 has a bore diameter 218 (FIG. 7) that is larger that the shaft diameter 146 to allow the shaft 142 to be extended through the bore 216 during initial assembly of the crimp barrel 102 with the terminal lug 200. As mentioned above, an enlarged head 148 (FIGS. 5 and 7) may be formed on the shaft end 144 as a means to loosely retain the terminal lug 200 with the crimp barrel 102.

In FIGS. 3-4, as mentioned above, the terminal lug 200 has a cylindrical portion 204 and a terminal tongue 226 extending outwardly from the cylindrical portion 204. The cylindrical portion 204 contains the conical cavity 220 which is configured complementary to the conical portion 120. The terminal tongue 226 is configured to be mounted to a terminal stud 504 of a terminal block 500. The terminal tongue 226 extends outwardly from the cylindrical portion 204 and may be parallel to the terminal lug longitudinal axis 202. However, the terminal lug 200 may be oriented nonparallel to the terminal lug longitudinal axis 202. In the example shown, the terminal tongue 226 includes a single tongue hole 230 for mounting to a terminal stud 504 of a terminal block 500. However, the terminal tongue 226 may includes two or more tongue holes 230 for mounting to a corresponding number of terminal studs 504 of a terminal block 500 or terminal board. The terminal tongue 226 may optionally include an angled portion 228 connecting the terminal tongue 226 to the end wall 212 of the cylindrical portion 204.

In the presently-disclosed terminal assembly 100, the crimp barrel 102, the terminal lug 200, and the locking collar 300 may each be separately formed as a unitary structure using any suitable manufacturing technique. For example, the crimp barrel 102, the terminal lug 200, and/or the locking collar 300 may each be formed by subtractive manufacturing (e.g., computer-numerical-control machining), by additive manufacturing (e.g., three-dimensional printing, stereo lithography, etc.) and/or by injection molding, casting, or another molding technique. The crimp barrel 102, the terminal lug 200, and the locking collar 300 may each be formed of an electrically conductive material such as a metallic material including, but not limited to, aluminum, steel, copper, tin-coated copper (e.g. Copalum™), or other alloys or combinations. Alternatively, the crimp barrel 102, the terminal lug 200, and/or the locking collar 300 may be formed of a non-metallic material that is preferably electrically conductive such as a metal-coated polymeric material.

Figure 5:
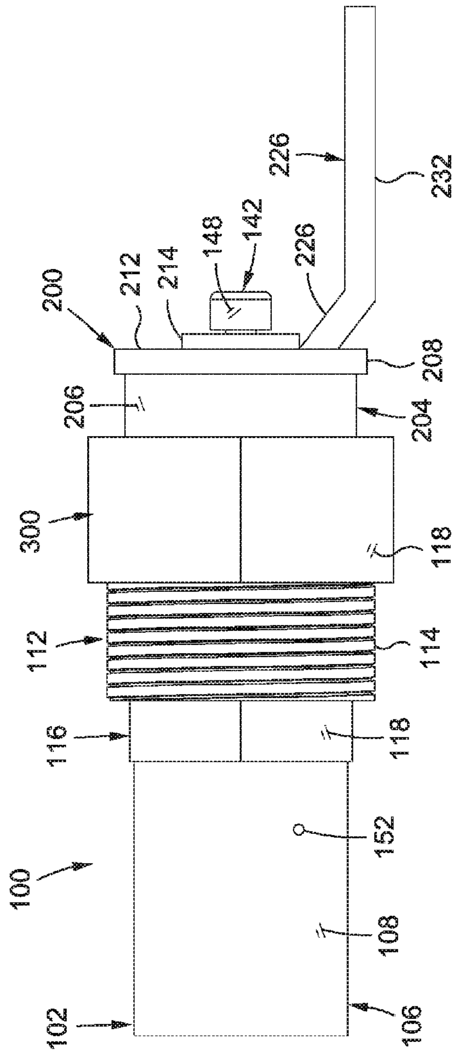
FIG. 5 is a side view of an example of the terminal assembly illustrating the shaft of the conical portion protruding through a bore formed in an end wall of the terminal lug, and further illustrating an enlarged head formed on the shaft end for retaining the terminal lug with the crimp barrel.
Figure 6:
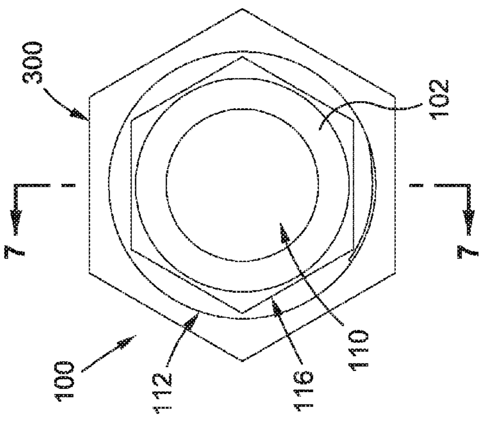
FIG. 6 is an end view of the terminal assembly of FIG. 5.
Figure 7:
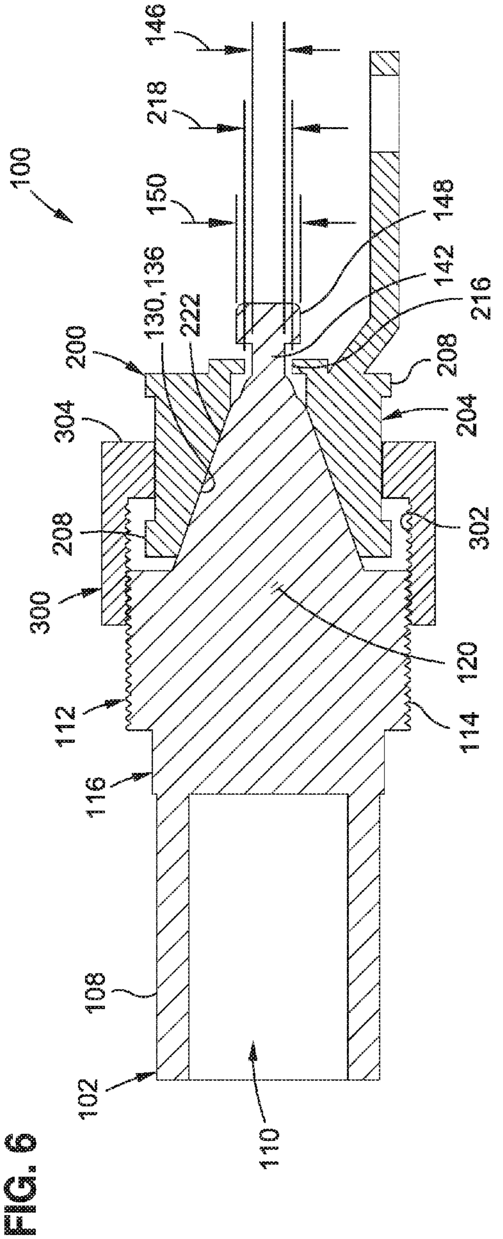
FIG. 7 is a side sectional view of the terminal assembly taken along line 7 of FIG. 6 and illustrating the locking collar engaged to the crimp barrel for mechanically and electrically coupling the terminal lug to the crimp barrel.

FIG. 5 is a side view of an example of the terminal assembly 100 illustrating the shaft 142 of the conical portion 120 protruding through the bore 216 in the end wall 212 of the terminal lug 200. An enlarged head 148 is formed on the shaft 142 for retaining the terminal lug 200 with the crimp barrel 102. FIG. 6 is an end view of the terminal assembly 100. FIG. 7 is a side sectional view of the terminal assembly 100 showing the locking collar 300 engaged to the crimp barrel 102 for mechanically and electrically coupling the terminal lug 200 to the crimp barrel 102. The locking collar 300 may include an inner annular shoulder 304 having a diameter that is slightly larger than the diameter of the cylindrical portion outer surface 206 to allow the locking collar 300 to freely rotate on the cylindrical portion 204.

The cylindrical portion 204 may include an outer annular shoulder 208 formed on each one of the opposing ends of the cylindrical portion 204. The diameter of each outer annular shoulder 208 may be larger than the diameter of the inner annular shoulder 304 of the locking collar 300 as a means to axially retain the locking collar 300 on the cylindrical portion 204. The inner annular shoulder 304 of the locking collar 300 is configured to bear against the outer annular shoulder 208 on one end of the crimp portion 106 during tightening of the locking collar 300. In the example shown, the locking collar 300 has a hex shape when viewed from an axial direction (FIG. 6). However, the locking collar 300 may be provided in other configurations. For example, the locking collar 300 may a single pair of diametrically-opposed flats 118 (not shown) which may be engaged by a hand tool (not shown—open end wrench) for rotating the locking collar 300 during tightening of the locking collar 300 onto the crimp barrel threads 114.

The enlarged head 148 may be integral with the shaft 142 protruding through the bore 216. In one example, the enlarged head 148 may be formed by upsetting the shaft end 144 (e.g., mushrooming the shaft end using a rivet gun) after the shaft 142 has been extended through the bore 216 during assembly of the terminal lug 200 with the crimp barrel 102. As indicated above, the enlarged head 148 is preferably formed with a head diameter 150 (FIG. 7) that is larger than the bore diameter 218 such that the terminal lug 200 is retained with the crimp barrel 102. The enlarged head 148 is preferably applied to (e.g., formed on) the shaft 142 such that a gap exists between the underside of the enlarged head 148 and the end wall 212 of the terminal lug 200. The gap between the underside of the enlarged head 148 and the end wall 212 allows for free rotation of the terminal lug 200 relative to the crimp barrel 102.

In the example shown in FIG. 7, the end wall 212 may have a raised boss 214 that is axially offset from the end wall 212. The raised boss 214 may surround the bore 216 and may be provided in a wall thickness that has sufficient strength and durability to avoid the enlarged head 148 pulling through the bore 216. In addition, the axially offset raised boss 214 may provide clearance for the cone end 126 of the conical portion 120. The crimp portion 106 may include an inspection hole 152 to allow one to visually confirm that the cable end 402 is fully inserted into the crimp portion cavity 110 and is therefore gripped or mechanically clamped by one or more crimps (not shown) that may be formed in the crimp portion 106, such as with a crimping tool.

Figure 12:
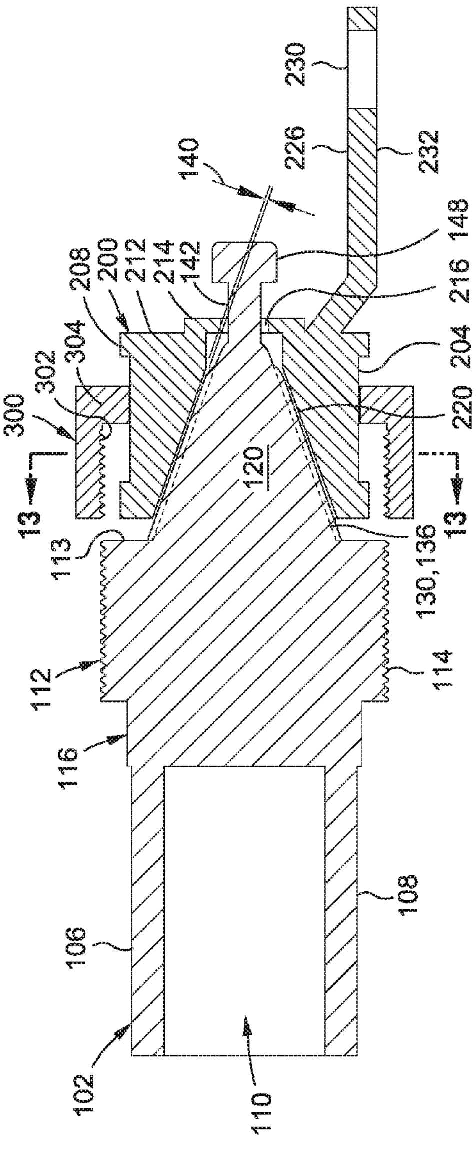
FIG. 12 is a side sectional view of the terminal assembly taken along line 12 of FIG. 11 and illustrating the locking collar disengaged from the crimp barrel and further illustrating protrusions on the conical portion of the crimp barrel.

FIG. 8 is an exploded perspective view of an example of the terminal assembly 100 showing the terminal lug 200 separated from the crimp barrel 102 prior to assembly. FIG. 9 is a side sectional view of the terminal assembly 100 of FIG. 8. FIG. 10 is a transverse sectional view of the terminal assembly 100 illustrating protrusions 130 configured as ribs 136 formed on the conical outer surface 122 of the conical portion 120. In the example shown, the locking collar 300 is mounted on the cylindrical portion 204 and is configured to threadably engage with crimp barrel threads 114 formed on the intermediate portion 112 of the crimp barrel 102. The shaft 142 is shown having a constant shaft diameter 146 prior to the shaft 142 being inserted through the bore 216 in the terminal lug 200 and the enlarged head 148 is applied to (e.g., formed on) the shaft end 144, as shown in (FIG. 12).

In an embodiment, the conical portion 120 may include at least three ribs 136 which may be generally equal angularly spaced around the circumference of the conical portion 120 such that the conical portion 120 will be generally centered relative to the conical cavity 220 when axially drawn together due to tightening of the locking collar 300 onto the threads of the crimp barrel 102. However, the conical portion 120 may be provided with any number of ribs 136. For example, the conical portion 120 may include from 3-20 or more ribs 136. Each one of the ribs 136 may be continuous along a majority of the axial length of the conical outer surface 122. However, one or more of the ribs 136 may extend along a portion of the length of the conical outer surface 122. One or more of the ribs 136 may be continuous along the lengthwise direction of the conical outer surface 122, or one or more of the ribs 136 may be discontinuous, having one or more lengthwise gaps (not shown) in one or more of the ribs 136.

In some examples, the ribs 136 may all have the same configuration. However, in other embodiments not shown, the conical portion 120 may include ribs 136 having different configurations. As indicated above, each rib 136 may have a rib height of from 0.001-0.050 inch or larger. In one example, the ribs 136 may each have a rib height of between 0.010 and 0.030 inch. The rib height of one or more of the ribs 136 may be constant along the length of each rib 136. However, in an alternative embodiment, the rib height of one or more of the ribs 136 may decrease along conical outer surface 122. For example, the rib height may decrease along a direction from the cone base 124 to the cone end 126.

Referring to FIG. 9, in some examples, the conical portion 120 may be provided with a conical outer surface cone angle 128 in the range of approximately 10-75 degrees. However, the conical outer surface cone angle 128 may be larger than 75 degrees. In one example, the conical outer surface cone angle 128 is preferably in the range of from approximately 30-60 degrees and, more preferably, in the range of from approximately 40-50 degrees. In a specific example, the conical outer surface cone angle 128 may be approximately 45 degrees±5 degrees.

The conical cavity 220 may have a conical inner surface cone angle 224 that is complementary to the conical outer surface cone angle 128. In some examples, the conical inner surface cone angle 224 may be larger than the conical outer surface cone angle 128 such that during assembly of the crimp barrel 102 with the terminal lug 200, the cone end 126 of the conical portion 120 physically engages the conical inner surface 222 of the conical cavity 220 prior to the cone base 124 of the conical portion 120 engaging the conical inner surface 222. In one example, the conical inner surface cone angle 224 may be up to 5 degrees larger than the conical outer surface cone angle 128. In a specific example, the conical inner surface cone angle 224 may be up to 2 degrees larger than the conical outer surface cone angle 128. In still other examples, the conical inner surface cone angle 224 may be within ±1 degree of the conical outer surface cone angle 128.

Figure 13:
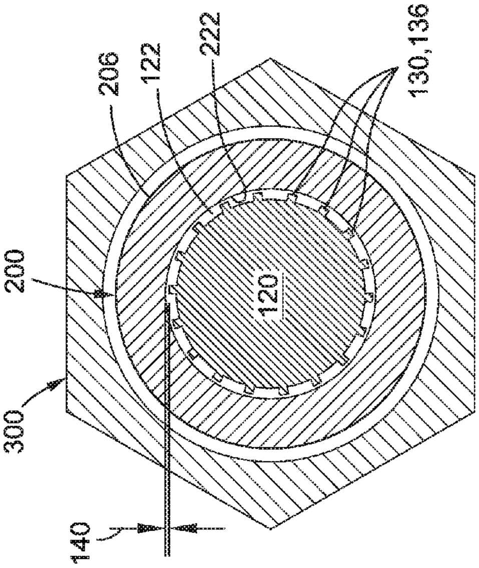
FIG. 13 is a transverse sectional view of the terminal assembly taken along line 13 of FIG. 12 and illustrating the angularly spaced ribs on the conical outer surface.
Figure 11:
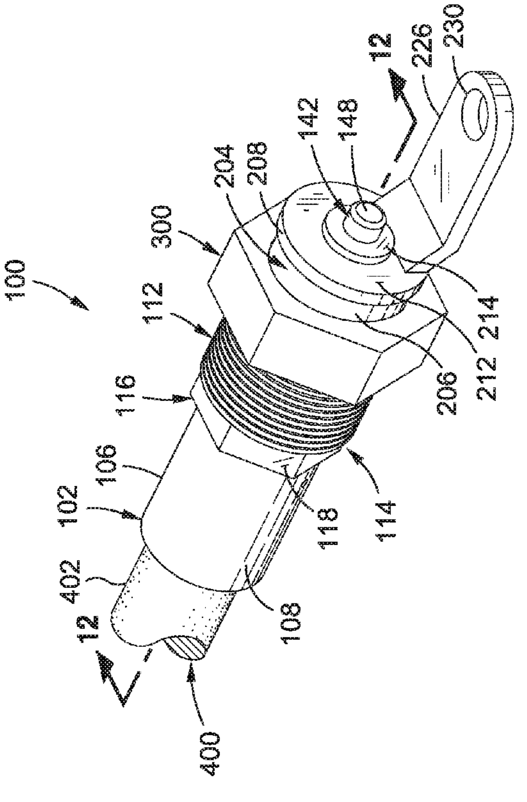
FIG. 11 is a perspective view of the terminal lug assembled with the crimp barrel and illustrating an enlarged head on the shaft of the conical portion.

FIG. 11 is a perspective view of the terminal lug 200 after assembly with the crimp barrel 102 and prior to the engagement of the collar threads 302 with the crimp barrel threads 114. FIG. 12 is a side sectional view of the terminal assembly 100. FIG. 13 is a transverse sectional view of the terminal assembly 100 showing the angularly spaced ribs 136 on the conical outer surface 122. One or more of the ribs 136 may be in contact with the conical inner surface 222 prior to tightening the locking collar 300 onto the threads of the crimp barrel 102. However, the terminal lug 200 is freely rotatable relative to the crimp barrel 102 to allow for clocking adjustment of the terminal lug 200 prior to tightening of the locking collar 300.

Figure 14:
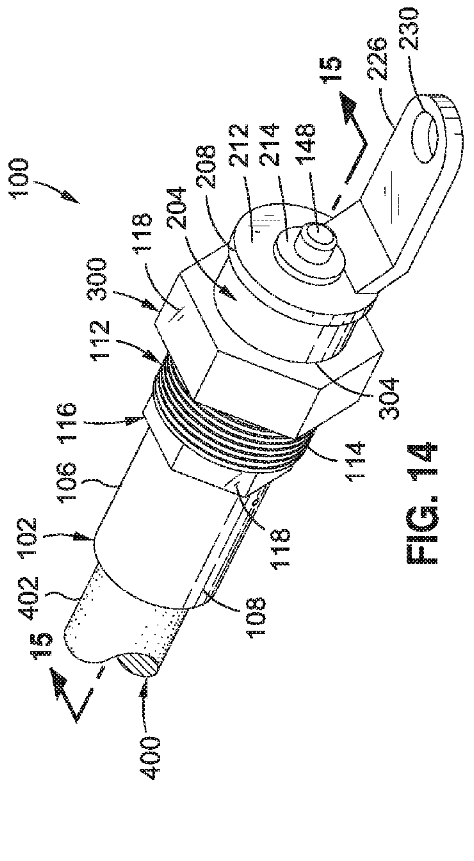
FIG. 14 is a perspective view of the terminal lug assembled with the crimp barrel and illustrating the locking collar engaged to the crimp barrel threads on the crimp barrel.
Figure 15:
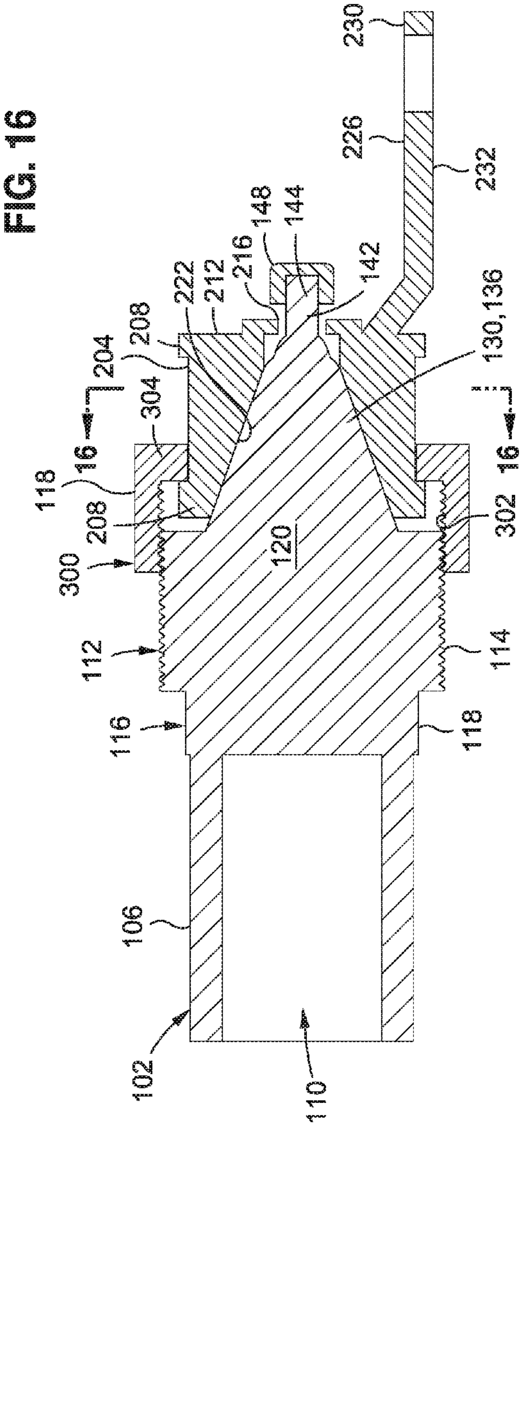
FIG. 15 is a side sectional view of the terminal assembly taken along line 15 of FIG. 14 and illustrating the collar threads of the locking collar engaged to the crimp barrel threads of the crimp barrel and further illustrating the ribs on the conical portion in direct physical contact with the conical outer surface of the conical cavity of the terminal lug.

FIG. 14 is a perspective view of the terminal lug 200 assembled with the crimp barrel 102. FIG. 15 is a side sectional view of the terminal assembly 100 of FIG. 15 and illustrating the locking collar 300 engaged with the crimp barrel threads 114 and further illustrating the enlarged head 148 applied onto the shaft end 144 as a separate component from the shaft 142. In this regard, FIG. 15 illustrates an example of the terminal assembly 100 wherein the enlarged head 148 may be formed as a separate component, and then attached to the shaft end 144 after the shaft 142 is inserted through the bore 216 in the end wall 212 of the terminal lug 200. The enlarged head 148 may be attached to the shaft end 144 by any one of a variety of attachment means including, but not limited to, adhesively bonding, threadably engaging, and/or by other means for securing the enlarged head 148 onto to the shaft end 144.

Figure 16:
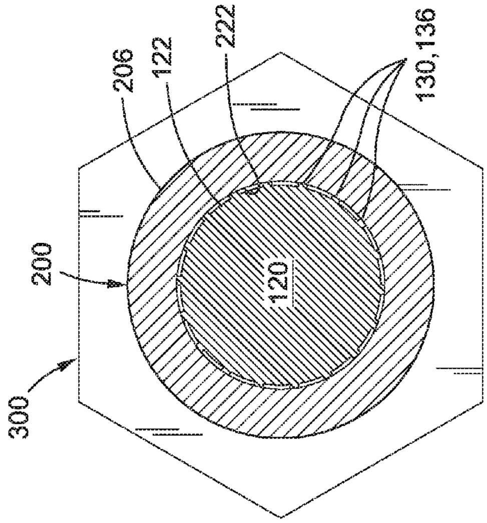
FIG. 16 is a transverse sectional view of the terminal assembly taken along line 16 of FIG. 15 and illustrating the protrusions in direct physical contact with the conical inner surface of the conical cavity.

FIG. 16 is a transverse sectional view of the terminal assembly 100 of FIG. 15 showing the protrusions 130 in direct physical contact with the conical inner surface 222 of the conical cavity 220. FIG. 15 illustrates the locking collar 300 tightened onto the crimp barrel threads 114 resulting in the ribs 136 on the conical portion 120 being drawn into direct physical contact with the conical inner surface 222 of the conical cavity 220. In the example shown, the anti-rotation feature 116 is included with the crimp barrel 102 and the locking collar 300 is mounted on the terminal lug 200. The anti-rotation feature 116 is located between the crimp portion 106 and the intermediate portion 112 of the crimp barrel 102. In the example shown, the anti-rotation feature 116 has a hex shape. As mentioned above, the anti-rotation feature 116 may be provided in an alternative embodiment such as a pair of diametrically-opposed flats 118 (not shown). The anti-rotation feature 116 may be engaged by a tool such as an open end wrench or other device configured to engage the flats 118 or hex shape of the anti-rotation feature 116 in a manner to restrict or prevent rotation of the crimp barrel 102 during tightening of the locking collar 300.

Referring to FIGS. 14-16, in some examples, the ribs 136 may be configured to at least partially deform during the tightening of the locking collar 300. Tightening of the locking collar 300 may mechanically deform the ribs 136 and eliminate gaps 140 between the ribs 136 and the conical inner surface 222. Regardless of whether or not the ribs 136 are mechanically deformed, the tightening of the locking collar 300 results in locking of the orientation of the terminal lug 200 relative to the crimp barrel 102 to thereby prevent rotation of the terminal lug 200 and establish electrical continuity between the conical portion 120 and the conical cavity 220.

Figure 17:
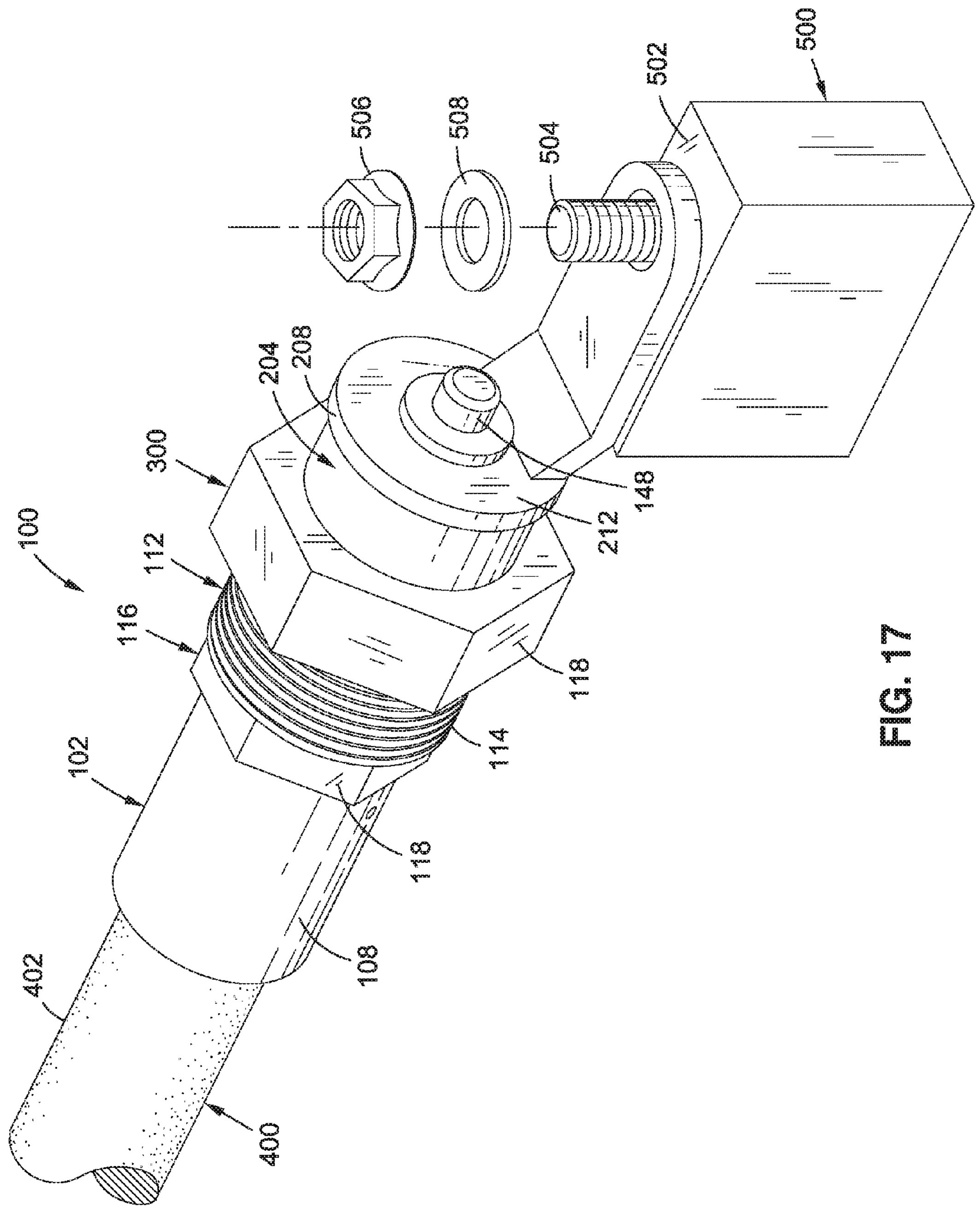
FIG. 17 is a perspective view of an example of a terminal assembly illustrating the clocking orientation of the terminal tongue matching the orientation of the outer surface of the terminal block.

FIG. 17 is a perspective view of an example of a terminal assembly 100 illustrating the terminal tongue 226 after adjustment of the orientation of the terminal tongue 226 to match the orientation of the outer surface 502 of the terminal block 500. In this regard, the clocking of the terminal lug 200 has been adjusted such that the terminal tongue bottom surface 232 is parallel to the outer surface 502 of the terminal block 500. A terminal nut 506 and washer 508 may be installed on the terminal stud 504 to secure the terminal tongue 226 to the terminal block 500.

Figure 18:
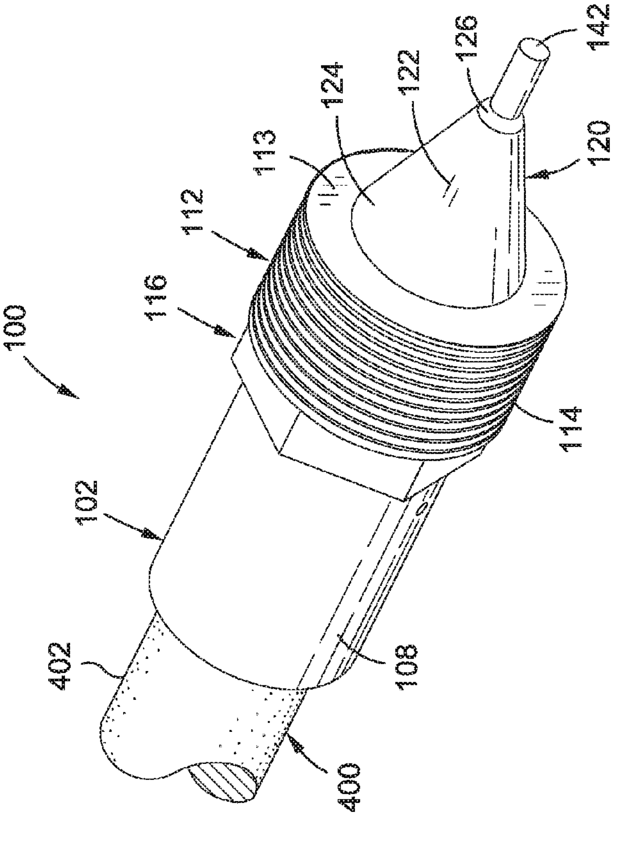
FIG. 18 is a perspective view of an example of a crimp barrel without any protrusions on the conical portion.

FIG. 18 is a perspective view of an example of a crimp barrel 102 configured without any protrusions 130 on the conical portion 120. For examples where the conical portion 120 is devoid of protrusions 130 and the conical cavity 220 is also devoid of protrusions 130, the locking collar 300 may be threadably engaged to the crimp barrel threads 114 until at least a portion of the conical outer surface 122 is in direct physical contact with the conical inner surface 222. The locking collar 300 may be tightened to an extent that the compressive force between the conical outer surface 122 and conical inner surface 222 results in locking of the orientation of the terminal lug 200, and the establishment of electrical continuity between the conical portion 120 and the conical cavity 220.

Figure 19:
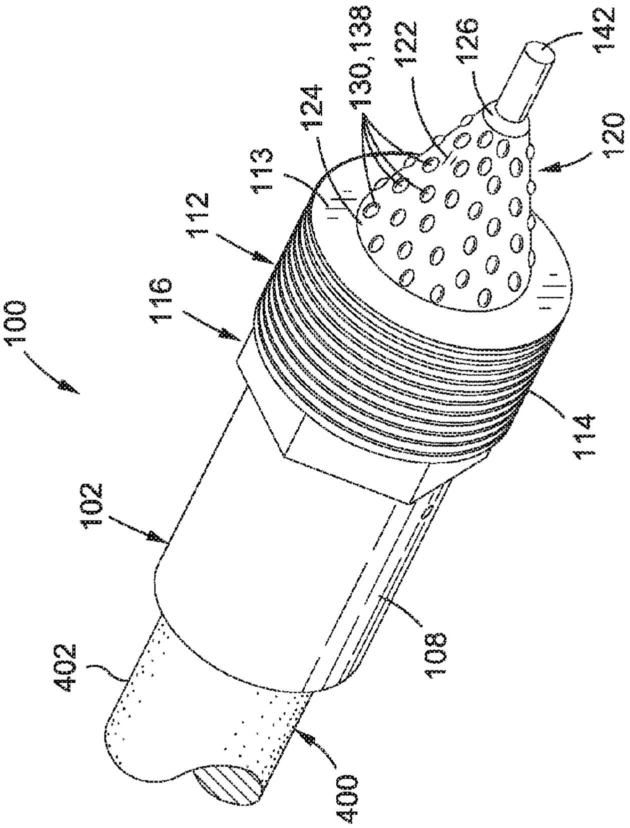
FIG. 19 is a perspective view of an example of a crimp barrel having protrusions in the form of raised bumps on the conical portion.

FIG. 19 is a perspective view of an example of a conical portion 120 having protrusions 130 in the form of a pattern of discrete raised bumps 138. The pattern of raised bumps 138 may be provided on either the conical outer surface 122 or on the conical inner surface 222 (not shown). The raised bumps 138 may be provided in any one of a variety of different sizes, shapes, and configurations. For example, the raised bumps 138 may each have a generally rounded shape or dome shape when viewed in cross-section along a direction parallel to the conical outer surface 122 or conical inner surface 222. The raised bumps 138 may have a generally rounded shape so as to preserve the ability to rotate the conical portion 120 relative to the conical cavity 220 prior to tightening of the locking collar 300. In one example, the raised bumps 138 may each have a polygonal shape when viewed in cross-section along a direction parallel to the conical outer surface 122 or conical inner surface 222. The discrete raised bumps 138 may each have a bump height similar to the above-described protrusion height of approximately 0.001-0.050 inch. In some examples, the discrete raised bumps 138 may be configured to deform when the conical portion 120 is drawn into physical engagement with the conical cavity 220 during tightening of the locking collar 300.

Figure 20:
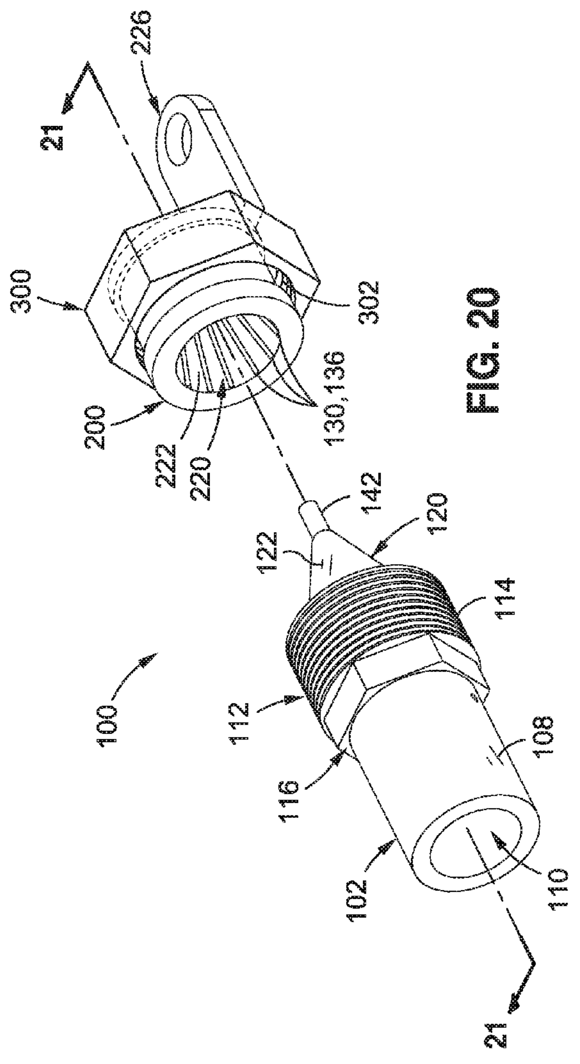
FIG. 20 is a rear perspective view of an example of a terminal assembly wherein the conical portion is devoid of protrusions and further illustrating angularly spaced ribs formed on the conical inner surface of the conical cavity of the terminal lug.

FIG. 20 is a rear perspective view of an example of a terminal assembly 100 wherein the conical portion 120 is devoid of protrusions 130, and the protrusions 130 are instead provided on the conical inner surface 222 of the conical cavity 220 in the form of angularly spaced ribs 136. The ribs 136 on the conical inner surface 222 of the conical cavity 220 may be sized, shaped, and configured in the same manner as the ribs 136 in the above-described examples of the conical portion 120. FIG. 21 is a side sectional view of the terminal assembly 100 of FIG. 20 showing the conical portion 120 being devoid of protrusions 130, and further showing ribs 136 formed on the conical inner surface 222 of the conical cavity 220 of the terminal lug 200. In a further embodiment not shown, protrusions 130 in the formed of raised bumps 138 may be provided on the conical inner surface 222 of the conical cavity 220.

FIG. 22 is a perspective view of an example of a terminal assembly 100 wherein the locking collar 300 is mounted on the intermediate portion 112 of the crimp barrel 102 instead of on the terminal lug 200 as in FIGS. 1-21. The locking collar 300 in FIG. 22 is configured to threadably engage terminal lug threads 210 formed on the cylindrical portion 204 of the terminal lug 200. FIG. 23 is a transverse sectional view of the terminal assembly 100 of FIG. 22 and illustrates the terminal lug threads 210 on the terminal lug 200, and shows the locking collar 300 mounted on the crimp barrel 102. The terminal assembly 100 of FIGS. 22-23 may include an anti-rotation feature 116 integrated into the terminal lug 200. For example, a hex-shaped anti-rotation feature 116 may be located between the terminal lug threads 210 and the terminal tongue 226. The terminal lug 200 and the crimp barrel 102 in FIGS. 22-23 may be assembled, rotationally adjusted, and installed on a terminal block 500 in a manner similar to the above-described assembly, rotational adjustment, and installation of the terminal assembly 100 of FIGS. 1-21.

Figure 24:
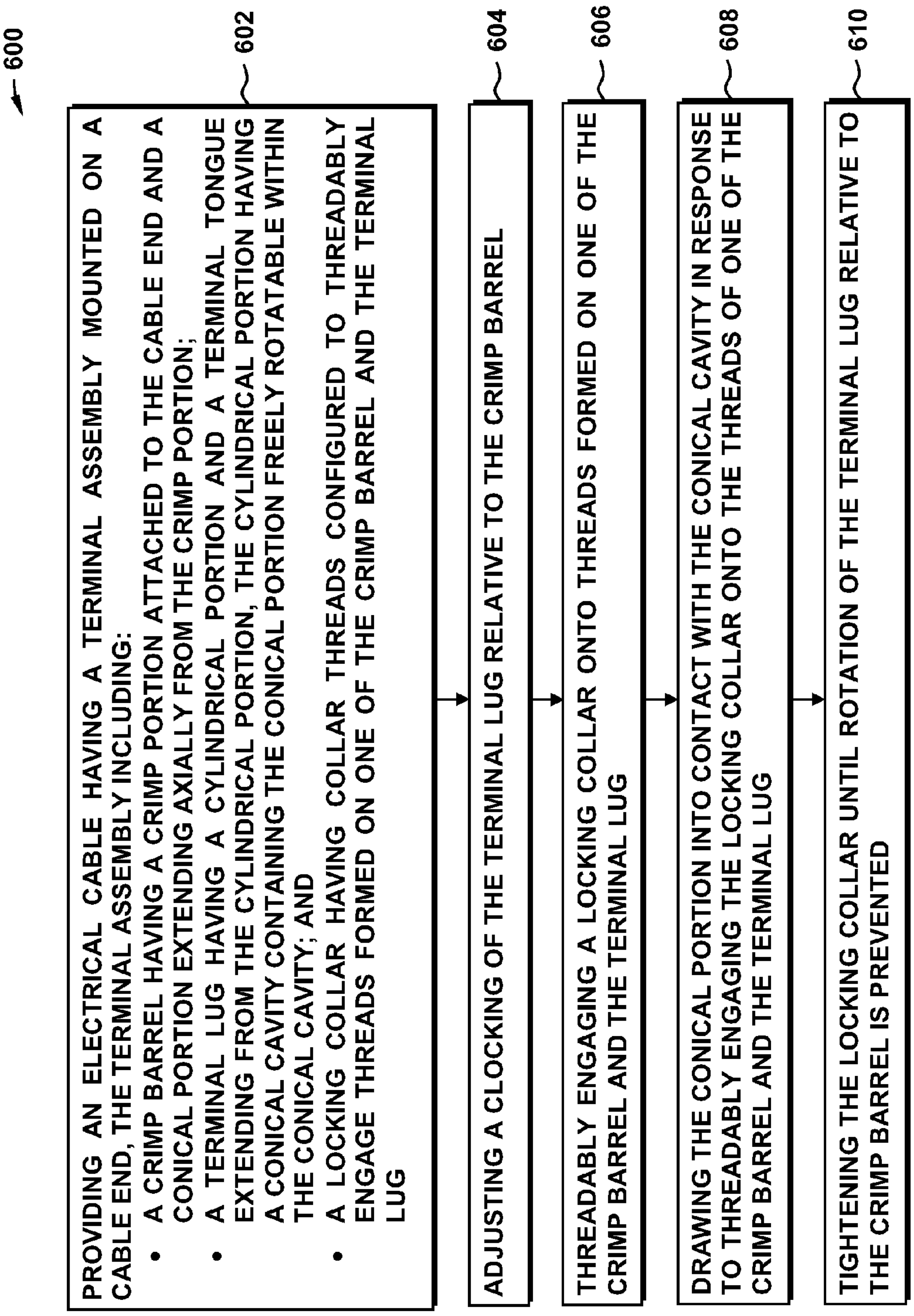
FIG. 24 is a flow diagram illustrating one or more operations that may be included in a method of installing a terminal assembly.

FIG. 24 is a flow diagram illustrating one or more operations that may be included in a method 600 of installing a terminal assembly 100, and which may include attaching a terminal assembly 100 to a terminal block 500. Step 602 of the method includes providing an electrical cable 400 having a terminal assembly 100 mounted on a cable end 402 of the cable 400. As described above and/or illustrated in FIGS. 1-23, the terminal assembly 100 includes a crimp barrel 102, a terminal lug 200, and a locking collar 300. The step of providing the cable 400 with the terminal lug 200 may include attaching the crimp barrel 102 to a cable end 402 of a cable 400. In one example, the crimp barrel 102 may be attached to the cable end 402 by inserting the cable end 402 into the crimp portion cavity 110 and then crimping (e.g., using a crimping tool—not shown) the crimp portion 106 onto the cable end 402. Alternatively, a crimp barrel 102 may be attached to a cable end 402 by soldering, adhesive bonding, and/or mechanically securing the crimp portion 106 to the cable end 402, as mentioned above.

The method 600 may additionally include inserting the conical portion 120 of the crimp barrel 102 into the conical cavity 220 of the terminal lug 200. In this regard, the terminal lug 200 may include a shaft 142 which may be extended through a bore 216 formed in the end wall 212 of the terminal lug 200 when the conical portion 120 into the conical cavity 220. An enlarged head 148 may be applied onto the shaft end 144 such as by mechanically deforming the shaft end 144 into a mushroom shape (FIG. 12) using a reciprocating tool such as a rivet gun (not shown) or other device. Alternatively, an enlarged head 148 may be separately manufactured (e.g., FIG. 15) and attached to the shaft end 144 by soldering, adhesive bonding, threadably engaging, and/or other attachment technique.

Step 604 of the method 600 includes adjusting the clocking orientation of the terminal lug 200 relative to the crimp barrel 102. The step of adjusting the clocking orientation of the terminal lug 200 relative to the crimp barrel 102 may include rotatably adjusting (FIG. 2) the clocking orientation of the terminal lug 200 until the terminal tongue bottom surface 232 of the terminal tongue 226 is approximately parallel (e.g., ±5 degrees) to an outer surface 502 of the terminal block 500. As indicated above, the method 600 may include retaining the terminal lug 200 with the crimp barrel 102 using the enlarged head 148 located one side of the end wall 212 and the conical portion 120 on the opposite side of the end wall 212.

Step 606 of the method 600 includes threadably engaging the locking collar 300, mounted on either the crimp barrel 102 or the terminal lug 200, onto threads formed on a remaining one of the crimp barrel 102 and the terminal lug 200. For example, the embodiments of the terminal assembly 100 in FIGS. 1-21 include a locking collar 300 rotatably supported on the intermediate portion 112 of the terminal lug 200. In such an arrangement, the method includes threadably engaging the locking collar 300 to the crimp barrel threads 114 on the intermediate portion 112 of the crimp barrel 102. Alternatively, for embodiments of the terminal assembly 100 wherein the locking collar 300 is rotatably supported on the cylindrical portion 204 of the crimp barrel 102 as shown in FIGS. 22-23, the method includes threadably engaging the locking collar 300 to terminal lug threads 210 on the cylindrical portion 204 of the terminal lug 200. The step of threadably engaging the locking collar 300 to crimp barrel threads 114 of the crimp barrel 102 or to terminal lug threads 210 of the terminal lug 200 may be performed using a hand tool engaged to the locking collar 300. For example, an open end wrench (not shown) may be engaged to the opposing flats 118 of a hex-shaped locking collar 300

The step of threadably engaging the locking collar 300 onto threads formed on the crimp barrel 102 or the terminal lug 200 may include preventing the rotation of the crimp barrel 102 or the terminal lug 200 onto which the locking collar 300 is being threadably engaged using an anti-rotation feature 116. If the locking collar 300 is rotatably supported on the crimp barrel 102, then the anti-rotation feature 116 may be included with the terminal lug 200. Conversely, if the locking collar 300 is rotatably supported on the terminal lug 200, then the anti-rotation feature 116 may be included with the crimp barrel 102. The step of preventing rotation of the crimp barrel 102 or the terminal lug 200 using the anti-rotation feature 116 may include gripping (e.g., using a hand tool—an open end wrench, a crescent wrench, etc.) a pair of diametrically-opposed flats 118 of the anti-rotation feature 116. For example, the anti-rotation feature 116 may be provided in a hex shape comprised of three pairs of diametrically-opposed flats 118.

Step 608 of the method 600 includes drawing the conical portion 120 of the crimp barrel 102 into contact with the conical cavity 220 of the terminal lug 200 during the threadable engagement of the locking collar 300 onto the threads of the crimp barrel 102 or the terminal lug 200. The terminal lug 200 is initially freely rotatable relative to the crimp barrel 102 during initial engagement of the collar threads 302 to the threads of the crimp barrel 102 (FIGS. 1-21) or terminal lug 200 (FIGS. 22-23). The freely rotatable terminal lug 200 may be rotatably adjusted to a desired orientation relative to the crimp barrel 102. For example, the clocking orientation of the terminal block 500 may be adjusted such that the terminal tongue bottom surface 232 of the terminal tongue 226 is approximately (e.g., ±5 degrees) parallel to the outer surface 502 of the terminal block 500.

Step 610 of the method 600 includes tightening the locking collar 300 onto the crimp barrel 102 or terminal lug 200 to compress together the conical portion 120 with the conical cavity 220 until rotation of the terminal lug 200 relative to the crimp barrel 102 is prevented. The locking collar 300 may be tightened and/or torqued to axially draw the conical portion 120 into direct physical engagement with the conical cavity 220 in a manner preventing rotation of the terminal lug 200 relative to the crimp barrel 102 and establishing electrical continuity between the conical portion 120 and the conical cavity 220, and thereby prevent arcing. The step of tightening the locking collar 300 may include preventing the rotation of the crimp barrel 102 (FIGS. 1-21) or terminal lug 200 (FIGS. 22-23) using the anti-rotation feature 116.

As described above and illustrated in the figures, the conical inner surface 222 of the terminal lug 200 or the conical outer surface 122 of the conical portion 120 of the crimp barrel 102 may optionally include protrusions 130. The protrusions 130 may be configured as ribs 136 as described above and illustrated in FIGS. 3-17 and 22-23, as a pattern of raised bumps 138 described above and illustrated in FIG. 19, or as other protrusion configurations. Alternatively, the conical portion 120 (e.g., FIG. 18) or the conical cavity 220 FIG. 4) may be devoid of protrusions 130. For embodiments that have protrusions 130, the step of drawing the conical portion 120 into contact with the conical cavity 220 may include mechanically deforming the protrusions 130 during tightening of the locking collar 300. For example, the method may include mechanically deforming the ribs 136 on the conical portion 120 against the conical inner surface 222 during tightening of the locking collar 300. Regardless of the configuration of the protrusions 130, the protrusions 130 may be configured to at least partially deform, and may create multiple electrical continuity paths between the conical outer surface 122 and the conical inner surface 222 as a means to prevent arcing between the crimp barrel 102 and the terminal lug 200 when electrical current is passing between the crimp barrel 102 and the terminal lug 200.

Although not shown, the method 600 may additionally include installing an insulating layer over the terminal assembly 100 and a portion of the cable 400 extending outwardly from the crimp portion 106 for electrically insulating the assembly and providing protection from the elements. For example, heat shrink tubing (not shown) may be applied over the terminal assembly 100 after adjustment of the clocking orientation of the terminal lug 200 and tightening of the locking collar 300. The insulation layer may be applied in a manner such that the terminal tongue 226 is uncovered to allow the terminal tongue bottom surface 232 to be placed in direct physical contact with the outer surface 502 of a terminal block 500.

As shown in FIGS. 2 and 17, the method 600 may include attaching the terminal tongue 226 to a terminal stud 504. The terminal stud 504 may protrude upwardly from any one a variety of devices such as a terminal block 500, an electrical component, a ground source, or other object. By inserting the terminal stud 504 through the terminal hole and engaging a terminal nut 506 and optional washer 508 onto the terminal stud 504, the terminal tongue 226 may be mechanically and electrically connected to the terminal block 500.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A variable-clocking terminal assembly, comprising:

a crimp barrel including a crimp portion having a crimp portion cavity sized and configured to receive a cable end of an electrical cable, the crimp barrel including a conical portion extending axially from the crimp portion;

a terminal lug having a cylindrical portion and a terminal tongue extending outwardly from the cylindrical portion, the cylindrical portion having a conical cavity configured complementary to the conical portion; and a locking collar having collar threads configured to threadably engage threads formed on one of the crimp barrel and the terminal lug for drawing the conical portion into direct physical engagement with the conical cavity in a manner locking an orientation of the terminal lug relative to the crimp barrel and establishing electrical continuity between the conical portion and the conical cavity.

2. The terminal assembly of claim 1, wherein:

the crimp barrel has a shaft extending axially outwardly from a cone end of the conical portion;

the cylindrical portion of the terminal lug has an end wall having a bore; and the shaft protruding through the bore and having an enlarged head located on a side of the end wall opposite the conical portion to retain the terminal lug with the crimp barrel.

3. The terminal assembly of claim 1, wherein:

the locking collar is mounted on the cylindrical portion of the terminal lug and configured to threadably engage with crimp barrel threads formed on an intermediate portion of the crimp barrel.

4. The terminal assembly of claim 1, wherein:

the locking collar is mounted on an intermediate portion of the crimp barrel and configured to threadably engage threads formed on the cylindrical portion of the terminal lug.

5. The terminal assembly of claim 1, further including:

a plurality of protrusions on one of a conical inner surface of conical cavity of the terminal lug and a conical outer surface of the conical portion of the crimp barrel.

6. The terminal assembly of claim 5, wherein:

the protrusions are angularly spaced ribs formed on one of the conical outer surface and conical inner surface and being generally axially oriented.

7. The terminal assembly of claim 1, wherein:

one of the crimp barrel and the terminal lug including an anti-rotation feature for preventing rotation of the crimp barrel relative to the terminal lug when tightening the locking collar.

8. The terminal assembly of claim 7, wherein:

the anti-rotation feature is located on the terminal lug; and the locking collar is mounted on the crimp barrel.

9. The terminal assembly of claim 7, wherein:

the locking collar is mounted on the crimp barrel; and the anti-rotation feature is included with the terminal lug.

10. A variable-clocking terminal assembly, comprising:

a crimp barrel including a crimp portion having a crimp portion cavity sized and configured to receive a cable end of an electrical cable, the crimp barrel including a conical portion extending axially from the crimp portion;

a terminal lug having a cylindrical portion and a terminal tongue extending outwardly from the cylindrical portion, the cylindrical portion having a conical cavity configured complementary to the conical portion; and a locking collar mounted on the cylindrical portion of the terminal lug and having collar threads configured to threadably engage with crimp barrel threads formed on an intermediate portion of the crimp barrel for drawing the conical portion into direct physical engagement with the conical cavity in a manner locking an orientation of the terminal lug relative to the crimp barrel and establishing electrical continuity between the conical portion and the conical cavity.

11. A method of installing a terminal assembly, comprising:

providing an electrical cable having a terminal assembly mounted on a cable end of the electrical cable, the terminal assembly including:

a crimp barrel having a crimp portion mounted on the cable end and a conical portion extending axially from the crimp portion;

a terminal lug having a cylindrical portion and a terminal tongue extending from the cylindrical portion, the cylindrical portion having a conical cavity containing the conical portion; and a locking collar having collar threads configured to engage threads formed on one of the crimp barrel and the terminal lug;

adjusting a clocking orientation of the terminal lug relative to the crimp barrel;

threadably engaging the locking collar onto threads formed on one of the crimp barrel and the terminal lug;

drawing the conical portion into contact with the conical cavity in response to threadably engaging the locking collar onto the threads of one of the crimp barrel and the terminal lug; and tightening the locking collar until rotation of the terminal lug relative to the crimp barrel is prevented.

12. The method of claim 11, wherein the step of rotatably adjusting a clocking orientation of the terminal lug relative to the crimp barrel includes:

retaining the terminal lug with the crimp barrel using a shaft extending from the conical portion into a bore formed in an end wall of the terminal lug and having an enlarged head on a side of the end wall opposite the conical portion.

13. The method of claim 11, wherein the locking collar is mounted on the cylindrical portion, the step of threadably engaging the locking collar onto threads formed on one of the crimp barrel and the terminal lug comprises:

threadably engaging the locking collar to crimp barrel threads formed on an intermediate portion of the crimp barrel.

14. The method of claim 11, wherein the locking collar is mounted on an intermediate portion of the crimp barrel, the step of threadably engaging the locking collar onto threads formed on one of the crimp barrel and the terminal lug comprises:

threadably engaging the locking collar to terminal lug threads formed on the cylindrical portion of the terminal lug.

15. The method of claim 11, wherein one of a conical inner surface of the conical cavity of the terminal lug and a conical outer surface of the conical portion of the crimp barrel includes protrusions, the step of drawing the conical portion into contact with the conical cavity comprises:

deforming one or more of the protrusions against one of the conical inner surface and the conical outer surface.

16. The method of claim 15, wherein the step of deforming one or more protrusions comprises:

deforming a plurality of angularly spaced ribs formed on one of the conical outer surface and conical inner surface.

17. The method of claim 11, wherein the step of threadably engaging the locking collar onto threads formed on one of the crimp barrel and the terminal lug includes:

preventing rotation of one of the crimp barrel and the terminal lug onto which the locking collar is being threadably engaged using an anti-rotation feature included with the one of the crimp barrel and the terminal lug onto which the locking collar is being threadably engaged.

18. The method of claim 17, wherein:

the anti-rotation feature is located on the terminal lug; and the locking collar is mounted on the crimp barrel.

19. The method of claim 17, wherein:

the locking collar is mounted on the crimp barrel; and the anti-rotation feature is included with the terminal lug.

20. The method of claim 11, further including:

attaching the terminal tongue of the terminal lug to a terminal stud.

* * * * *